March 1, 1960 J. SHIRMAN ET AL 2,927,166
SIGNAL COMBINING CIRCUIT PROVIDING CROSSTALK ELIMINATION
Filed March 19, 1959
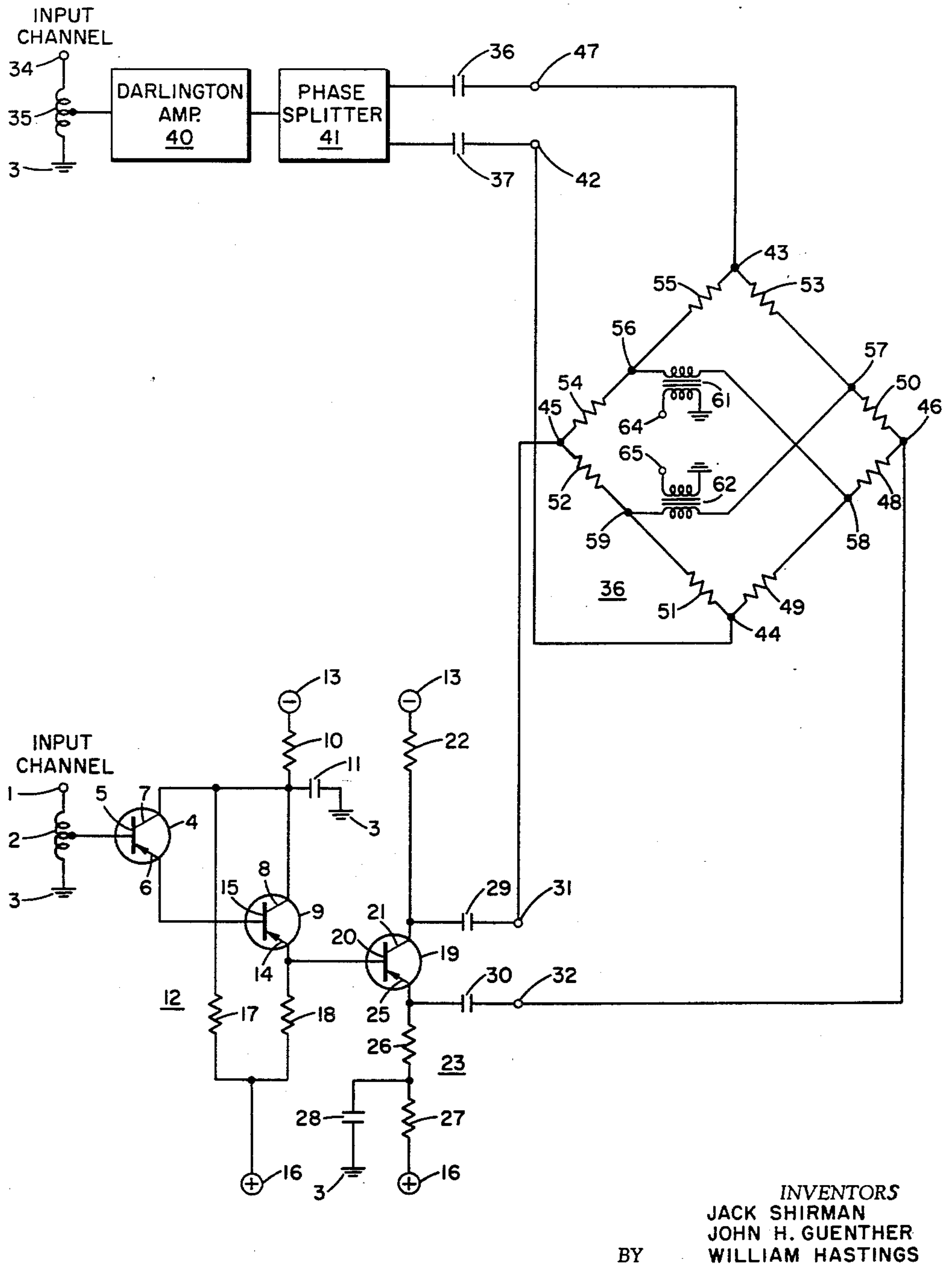
INVENTORS
JACK SHIRMAN
JOHN H. GUENTHER
WILLIAM HASTINGS
BY [signature]
ATTORNEY United States Patent Office 2,927,166

Patented Mar. 1, 1960

2,927,166

SIGNAL COMBINING CIRCUIT PROVIDING CROSSTALK ELIMINATION

Jack Shirman, John H. Guenther, and William Hastings, Rochester, N.Y., assignors to General Dynamics Corporation, Rochester, N.Y., a corporation of Delaware Application March 19, 1959, Serial No. 800,477

3 Claims. (Cl. 330—14)

The present invention relates to signal combining circuits.

It is often necessary to combine two signals present in two separate input channels so that they are both transmitted to one or more output circuits. It is often desirable to prevent an input signal present in one input channel from being fed back into the other input channel. For instance, in certain telephone systems the calling party's line may be connected through a first telephone exchange to a first input of a combining circuit located in a second telephone exchange. A called party's line may be coupled to a second input of the combining circuit. A recall indicator may be coupled to the output of the combining circuit so that an operator located in the second telephone exchange may be alerted by a recall signal transmitted by the called party. If the called party transmits a recall signal, this signal will actuate the recall indicator since the called party's line is coupled to the combining circuit. However, it is important that the recall signal be kept out of the channel connected from the first telephone exchange to the first input terminal of the combining circuit. If the recall signal is fed back to this channel, an operator at the first exchange will also be alerted unnecessarily and thus isolation of the two input channels is of considerable importance. In addition, ring trip and release equipment is connected to the output of the combining circuit at various times, and it is important that these corresponding changes in the output load of the combining circuit do not affect the calling and called parties' signalling channels, so that changes in the voice level and the introduction of noise may result. This invention finds use in a telephone system of the type described in copending application Serial No. 814,924 filed May 21, 1959, and assigned to the assignee of the present invention.

Accordingly, it is an object of the present invention to provide a new, improved and inexpensive plural input channel combining circuit.

It is a further object of the present invention to provide for an improved plural input channel combining circuit which prevents a signal present in a first input channel from being fed back into a second input channel to produce crosstalk.

It is a further object of the present invention to provide for a plural input channel combining circuit which prevents fluctuations in the load impedance at the output of the combining circuit from affecting the first and second input channels.

Accordingly, a feature of the present invention is the provision of a hybrid network in the combining circuit to isolate one input channel from the other, so that an input signal present on one input channel is not transferred to the other input channel through the combining circuit.

Another feature of the present invention is the provision of very high input impedance amplifiers connected between each input channel and the hybrid network so that changes in load impedance of the combining circuit due to loads being connected to, and removed from, the output of the combining circuit do not affect the audio level within each input channel and do not cause clicks or other noises to be induced into these channels.

Another feature of the present invention in accordance with the afore-mentioned features is the provision of transistorized phase splitters to feed input signals from each input channel into the hybrid network, instead of heavier and more costly transformers formerly utilized for this purpose, and to exhibit high insertion loss in the reverse direction to thereby discourage feedback and the resulting crosstalk.

Further objects, features and the attendant advantages of the invention will become apparent with reference to the following specification and drawings.

Referring now to the figure of the drawing, a first input channel which is represented by terminal 1 is disclosed connected to ground 3 through autotransformer 2. Transistor 4 which forms part of Darlington amplifier 12 has a base 5 which is connected to autotransformer 2. Collector 7 of transistor 4 is connected to a negative terminal 13 of a power supply (not shown) through resistor 10. Emitter 6 of transistor 4 is connected to base 15 of transistor 9. The collector 8 of transistor 15 is connected to negative terminal 13 through resistor 10, and is connected to capacitor 11 which is in turn connected to ground 3. Emitter 14 of transistor 9 is connected to a positive terminal 16 of the afore-mentioned power supply through resistor 18 and is also connected to base 20 of transistor 19 which forms part of phase splitter 23. Variations in the input signal applied at terminal 1 are amplified by the Darlington amplifier and are applied to the base 20 of transistor 19 which controls the conductivity of this transistor of phase splitter 23. A Darlington amplifier is utilized since it is one having a very high input impedance and a low output impedance, and thereby reduces crosstalk between channels. The emitter 25 of transistor 19 is connected in series with resistor 26 and resistor 27 to terminal 16. By-pass capacitor 28 is connected to the junction point of resistors 26 and 27 and grounded to provide for emitter base bias. Collector 21 of transistor 19 is connected to negative terminal 13 through resistor 22. The signal at emitter 25 will be in phase with the signal fed into base 20 from the output of Darlington amplifier 12 and the signal at collector 21 will be 180° out of phase with the signal fed into base 20. The push-pull output of phase splitter 23 is coupled to hybrid network input terminals 31 and 32 through capacitors 29 and 30.

A second input channel represented by terminal 34 is coupled to a Darlington amplifier 40 which in turn is coupled to a phase splitter 41, the output of which is coupled to hybrid network input terminals 42 and 47 through capacitors 36 and 37. Since Darlington amplifier 40 is identical with Darlington amplifier 12, and since phase splitter 41 is identical with phase splitter 23, these circuits are not shown in detail.

Hybrid network 36 comprises resistors 54 and 55 connected in series to form a first arm. A second arm comprising series connected resistors 50 and 53 is connected to the first arm at point 43. A third arm comprising series connected resistors 48 and 49 is connected to the second arm at point 46, and a fourth arm comprising series connected resistors 51 and 52 is connected to the third arm at point 44 and to the first arm at point 45. The series resistors are connected together in each arm at intermediate points 56, 57, 58 and 59 as shown in the figure. Diagonally opposite points 43 and 44 are coupled to hybrid network input terminals 42 and 47 and diagonally opposite points 45 and 46 are coupled to hybrid network input terminals 31 and 32 so that the amplified and phase split signals in each channel are applied to opposite points of the hybrid network. Opposite intermediate points 56 and 58 are connected to the primary winding of output transformer 61, and opposite intermediate points 57 and 59 are connected to the primary winding of output transformer 62.

The operation of the circuit is as follows: an input signal applied to terminal 1 will be amplified by high input impedance Darlington amplifier 12 and phase split 180° by phase splitter 23 and thereafter applied to opposite points 45 and 46 of the hybrid network. Because the signal has been split in phase, a voltage difference between opposite points 45 and 46 will exist for the duration of the signal. Assuming all the resistors in the hybrid network are of equal value, one-quarter of the voltage drop between opposite points 45 and 46 will appear equally across each resistor. This means that the voltage at point 43 with respect to point 45 is equal to the voltage at point 44 with respect to point 45 and thus the difference voltage between points 43 and 44 will at all times be zero, and a signal cannot be fed back to phase splitter 41 through capacitors 36 and 37, and thus the input signal applied at terminal 1 will not be present in the signal channel represented by terminal 34. For the same reason, an input signal applied at terminal 34 will not be present in the channel represented by terminal 1, and thus crosstalk between the two channels is eliminated. However, a signal applied between any pair of oppositely connected points of the hybrid network will appear in both output transformers 61 and 62. For instance, if a signal is applied between opposite points 45 and 46, the voltage of point 58 with respect to point 45 will be equal to three-fourths of the voltage applied between the two opposite terminals whereas the voltage of point 56 with respect to point 45 will be merely one-fourth of the total voltage applied to the opposite terminals, and thus a differential between point 58 and point 56 will be present at all times which is equal to one-half of the voltage applied to the opposite points 45 and 46, to produce an output from transformer 61. An output signal will also be produced by transformer 62 because the primary winding of transformer 62 is connected to points 57 and 59 and the difference between these two points will also be one-half of the total voltage applied at any instant to opposite points 45 and 46.

The Darlington amplifiers and the phase splitters are designed so that they exhibit a high insertion loss in the reverse direction to prevent changes in the load impedances from being reflected in the input channels to produce noises or variations in the audio level. For the same reason, Darlington amplifiers are utilized since they have a very high input impedance.

We have provided transistorized phase splitters to couple each input channel to the hybrid network because these phase splitters exhibit high insertion loss in the reverse direction. In the prior art, transformers have been utilized to couple the input channels to the hybrid network. However, we have found they have a low insertion loss in the reverse direction and might even amplify any signal attempting to travel through the channel in the reverse direction. Our transistorized phase splitters, because they exhibit a high insertion loss in the reverse direction, will tend to eliminate any such signal at the input terminal of the channel. In addition, the transistorized phase splitters are lighter in weight and less costly than transformers.

While we have shown and described a specific embodiment of our invention, other modifications will readily occur to those skilled in the art. We do not therefore desire our invention to be limited to the specific arrangement shown and described, and we intend in the appended claims to cover all modifications within the spirit and scope of our invention.

What is claimed is:

1. A signal combining circuit comprising first and second signal sources, first and second amplifiers having high impedance input circuits connected respectively to said first and second signal sources, first and second phase splitting means connected to output circuits of said first and second amplifiers respectively, a hybrid network having four arms connected together at first, second, third and fourth corners, each arm further comprising two impedance elements connected together in series at an intermediate point so that a first, second, third and fourth intermediate point is associated with a first, second, third and fourth arm of said network, an output circuit of said first phase splitting means connected across said first and third corners of said hybrid network and an output circuit of said second phase splitting means connected across said second and fourth corners of said hybrid network, a first output circuit connected across said second and fourth intermediate points of said hybrid network and a second output circuit connected across said first and third intermediate points of said hybrid network.

2. The combination as set forth in claim 1 wherein said impedance elements comprise resistors.

3. The combination as set forth in claim 1 wherein said first and second phase splitting means each comprises an amplifying element having an input electrode, an output electrode and a control electrode, a first resistor connected in series with said input electrode and a source of biasing voltage, a second resistor connected in series with said output electrode and said source of biasing voltage, a first and second output terminal and first D.C. blocking means connected between said first output terminal and said output electrode and second D.C. blocking means connected between said second output terminal and said input electrode, said control electrode coupled to an input terminal.

No references cited.